United States Patent [19]

Wells

[11] Patent Number: 4,856,575
[45] Date of Patent: Aug. 15, 1989

[54] WINDOW ASSEMBLY FOR SEGMENTED STRUCTURE

[76] Inventor: David F. Wells, 17006 Meekland Ave., Hayward, Calif. 94541

[21] Appl. No.: 210,833

[22] Filed: Jun. 24, 1988

[51] Int. Cl.[4] ............................................. A47G 5/00
[52] U.S. Cl. .................................... 160/353; 160/377; 160/116; 160/405; 52/208; 49/171; 29/445
[58] Field of Search ............... 160/354, 104, 371, 377, 160/380, 180, 353, 370.1, 405, 116; 29/445; 256/1, 24, 73; 52/302, 303, 656, 663, 664, 473, 211, 208, 106; 49/171

[56] References Cited

U.S. PATENT DOCUMENTS

| | | | |
|---|---|---|---|
| 482,844 | 9/1892 | Herrington | 160/180 X |
| 1,060,549 | 4/1913 | Hurlbutt | 256/1 |
| 1,509,569 | 9/1924 | Swanson | 160/104 X |
| 1,856,323 | 5/1932 | Feaster | 160/353 |
| 3,985,174 | 10/1976 | Bricker | 160/180 |

Primary Examiner—Blair M. Johnson
Attorney, Agent, or Firm—Bielen & Peterson

[57] ABSTRACT

A window for a segmented edifice utilizing three frames, each having a plurality of openings through the same. The first two frames sandwiched the segmented edifice and are held in such configuration by a multiplicity of fasteners. A third frame having a cross member such as a screen is then fastened to the second frame to create a secure window.

5 Claims, 1 Drawing Sheet

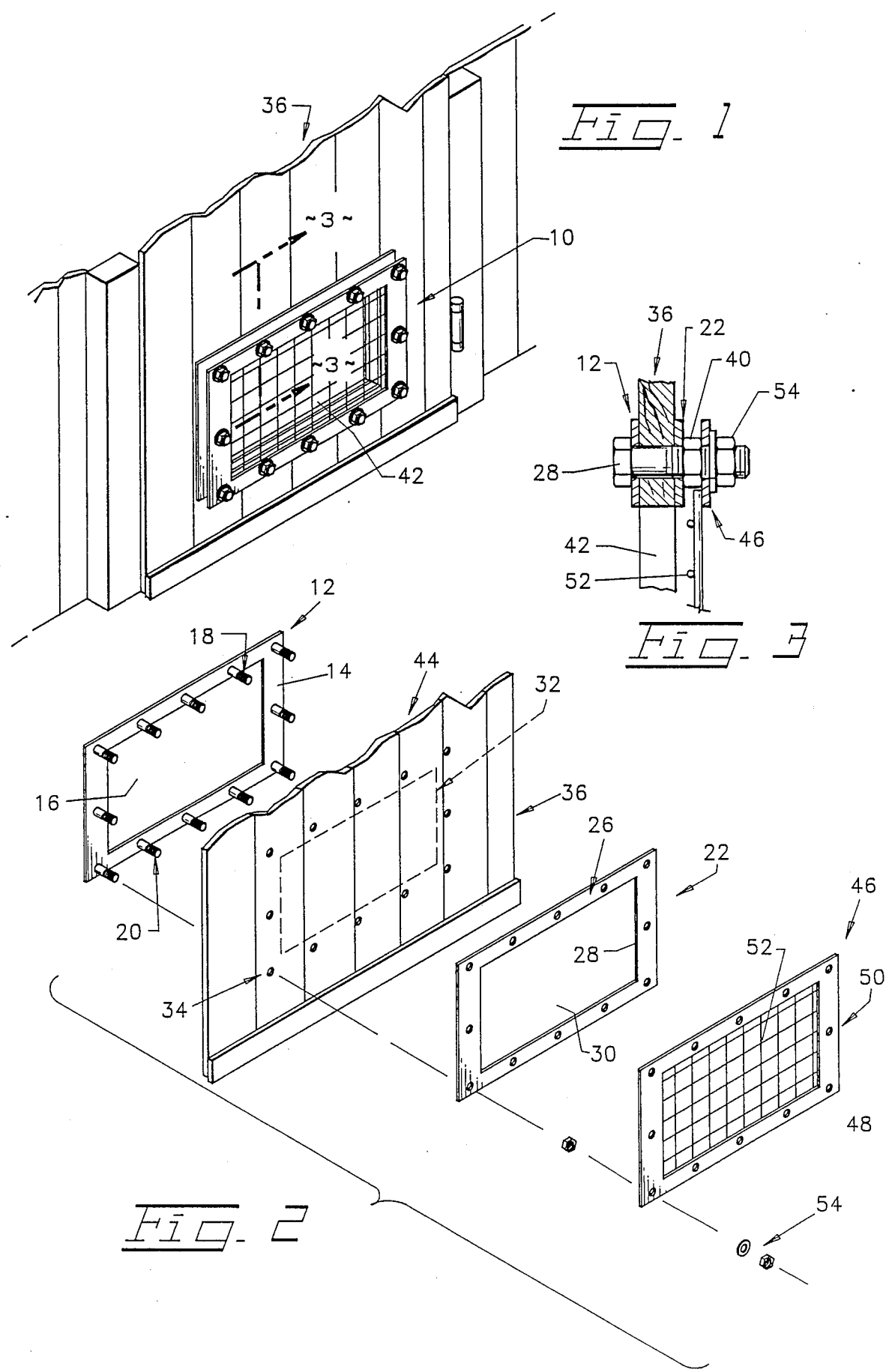

WINDOW ASSEMBLY FOR SEGMENTED STRUCTURE

BACKGROUND OF THE INVENTION

The present invention relates to a novel window structure which is especially useful for pets.

Pets, such as dogs, must often be confined to yards that are surrounded by picket fences and gates. Unfortunately, the pet is not able to see through such fences and gates which creates a certain anxiety in the animal. For example, dogs often attempt to climb out of the enclosure or to engage in excessive barking at strangers passing the enclosed yard. On the other hand, undesirable prowlers are often buoyed by the presence of a enclosed fence and gate in breaking and entering into a building adjacent the same.

Unfortunately, installing of a window or opening through segmented structure, such as a picket fence is very difficult to achieve, since the segments or pickets fall apart in the process. Thus, the fence, must often be temporarily braced or removed to a workshop to accomplish the same.

A window which may be successfully installed in place in a segmented fence or gate would be a notable advance in animal enclosures.

SUMMARY OF THE INVENTION

In accordance with the present invention a novel window for a segmented structure such as a gate or a fence is provided.

The window of the present invention employs a first frame having a border member surrounding a space. The border member includes a plurality of openings which hold a series of elongated members such as bolts. The bolts may be attached to the first frame and extended through the border openings. A second frame is also included having a border member surrounding a space with a plurality of openings which are alignable with the openings of the first frame. The second frame may be used as a template such that holes may be drilled into the segmented gate or fence at the central portions of each of the segments. After drilling such openings through the fence or gate, the elongated bolts may sandwich the fence or gate between the first and second frames. Keepers such as nuts would hold this assembly in place at which time an opening may be cut in the fence or gate around the inside perimeter formed by the combined first and second frames.

A third frame may also be employed having a border member and the plurality of openings therethrough corresponding to the position of the elongated bolts associated with the first and second frames. The third frame would also include a cross member such as a screen to prevent escape of the pet from the enclosure form by the gate or fence. The third frame may also be fastened to the elongated members and held in place by nuts or other fastening devices.

It may be apparent that a novel and useful window assembly for a segmented structure has been described.

It is therefore an object of the present invention to provide a window assembly for a segmented structure which is easily retrofitted on any wooden picket gate or fence.

It is another object of the present invention to provide a window assembly for a segmented structure which permits a pet to view the environment external to the pet enclosure.

Another object of the present invention is to provide a window assembly for a segmented structure which serves as a deterrent to potential trespassers.

Yet another object of the present invention is to provide a window assembly for a segmented structure which may be formed into a variety of shapes and sizes without detracting from the strength and stability of such an assembly.

The invention possess other objects and advantages especially as concerns particular characteristics and features thereof which will become apparent as the specification continues.

BRIEF DESCRIPTION OF THE DRAWINGS

FIG. 1 is a top left perspective view of the window assembly of the present invention in place on a picket gate.

FIG. 2 is an exploded view of the window assembly of the present invention illustrating the picket gate in broken away configuration.

FIG. 3 is a sectional view taken along line 3—3 of FIG. 1.

For a better understanding of the invention, reference is made to the following detailed description of the preferred embodiments thereof which should be taken in conjunction with the hereinabove described drawings.

DESCRIPTION OF THE PREFERRED EMBODIMENTS

Various aspects of the present invention will evolve from the following detailed description of the preferred embodiment which should be referenced to the prior described drawings.

The invention as a whole is noted in the drawings by reference character 10. Window assembly 10 includes as one of its element a first frame 12 having a border member 14 surrounding space 16. Border member 14 also includes a plurality of openings 18 therethrough, occupied by a plurality of bolts 20. Bolts 20 may be fixed to border member 14 or held loosely within plurality of openings 18. A second frame 22 is also defined to possess a border member 24 with a plurality of openings 26 through the same, generally alignable with openings 18 of first frame 12 and able to accept plurality of bolts 20. Second frame 22 possesses an inner perimeter 28 which encloses a space 30. Inner perimeter 28 may be employed as a template to produce a pattern 32, FIG. 2, which represents the eventual opening of window assembly 10. Also, plurality of openings 26 of second frame 22 may serve as a pattern for multiplicity of openings 34 which may be drilled through segmented or picket gate 36, at the most desirable locations, FIGS. 1 and 2.

With reference to FIG. 3 it may be observed that first frame 12 and second frame 22 sandwich gate 36. Bolt 38 of plurality of bolts 20 maintains such relationship by the use of a nut 40. At this point, opening 42 may be cut into gate 36 by a keyhole saw or the like. It should be noted, that plurality of pickets 44 of gate 36 will be maintained in securement after opening 42 is cut. Further, plurality of holes 34 through gate 36 placed at the most desired locations on gate 36 by the use of second frame 22, adds to the strength of window assembly 10, heretofore described.

Third frame 46 includes a border member 48 with a plurality of openings 50 through the same. Plurality of openings 50 would align with plurality of openings 26, picket holes 34, and plurality of bolts 20. Third frame 36 further includes cross member 52 which may be in the form of a screen, a set of bars, a mesh, and the like. As depicted in FIG. 2, cross member 52 is a screen. Nuts and washers 54, hold third frame 46 to the combined first screen 12, gate 36 and second frame 32, above described. Although FIG. 3 depicts a typical bolt 28 utilizing nuts and washers 40, 46, it should be pointed out that a multiplicity of such nuts and washers may be employed as shown in FIG. 1.

Frames 12, 22, and 46 may be constructed of any convenient material such as metal, wood, plastic, and the like. It should also be noted that although frames 12, 22, and 46 are shown as being rectangular, other shapes may be employed such as triangular, circular, polygonal and the like.

In operation, the user installs window assembly 10 by placing frame 22 on picket gate 36 or on any other segmented structure. Plurality of openings 26 are positioned as desired to obtain the maximum support from picket gate 36. At this point plurality of openings are marked on picket gate 36 using frame 22 as a template. The user then drills the necessary openings through picket gate 36 and passes frame 12 with plurality of bolts 20, therethrough. Frame 22 is then placed over plurality of bolts 20 and held thereto by multiplicity of nuts such as nut 40, FIG. 3. At this point, opening 42 would be cut through gate 36 with a suitable saw. Third frame 36 including cross member 52, is then placed over second frame 22 to complete the window assembly, as shown in FIG. 1.

While in the foregoing embodiments of the present invention have been set forth in considerable detail for the purposes of making a complete disclosure of the invention, it may be apparent those of skill in the art that numerous changes may be made in such detail without departing from the spirit and principles of the invention.

What is claimed is:

1. A window assembly for a segmented structure having a series of passages therethrough comprising:
   a. a first frame having a first border member surrounding a space, said first border member including a plurality of openings therethrough;
   b. a second frame having a first border member surrounding a space, said first border member including a plurality of openings therethrough;
   c. a plurality of elongated members each being capable of extending through one of said openings through, in order, said first border member, through one of the passages through the segmented edifice, and through one of said openings through said second border member;
   d. first keeper means for holding each of said plurality of elongated members in a position through said first and second border members and the segmented structure and thereby being able to hold the first and second frames in respective positions to engage opposite sides of the segmented structure;
   e. a third frame having a third border member surrounding a space said third border member including a plurality of openings therethrough, said third frame including a cross member extending across said space within said third border member, each of said elongated members extending through a respective one of said third border member openings; and
   f. second keeper means for holding said third frame on said plurality of elongated members, said first and second keeper means each comprising a plurality of elements capable of frictionally engaging said plurality of elongated members to limit movement of said plurality of elongated members through the series of passages of the segmented structure.

2. The window assembly of claim 1 in which said plurality of elongated members are threaded bolts and said first and second keeper means are threaded members each of which is capable of threadingly engaging at least one of said threaded bolts.

3. The window assembly of claim 1 in which includes means for fixing at least one of said elongated members to said first frame.

4. The window assembly of claim 3 in which said cross member of said third frame comprises a mesh screen.

5. The window assembly of claim 1 in which said at least two openings of each of said first, second, and third border member frames are alignable.

* * * * *